Jan. 18, 1944.  H. M. NORMAN  2,339,743
ELECTRIC SPEEDOMETER
Filed Dec. 5, 1938  5 Sheets-Sheet 1

Inventor:
Horace M. Norman
By Williams, Bradbury,
McCaleb & Hinkle
Attys.

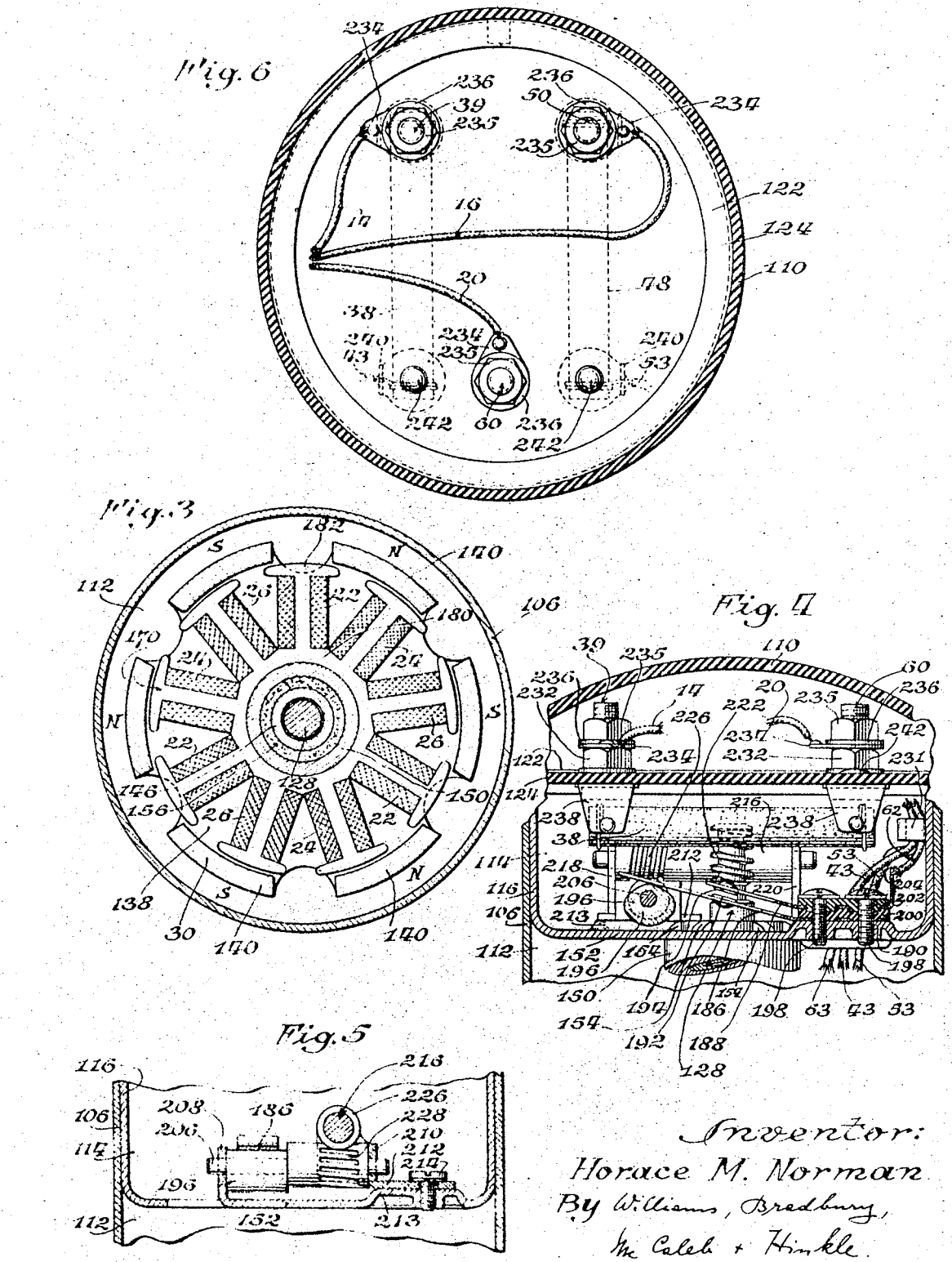

Jan. 18, 1944. H. M. NORMAN 2,339,743
ELECTRIC SPEEDOMETER
Filed Dec. 5, 1938 5 Sheets-Sheet 3

Inventor:
Horace M. Norman
By Williams, Bradbury,
McCaleb & Hinkle
Attys.

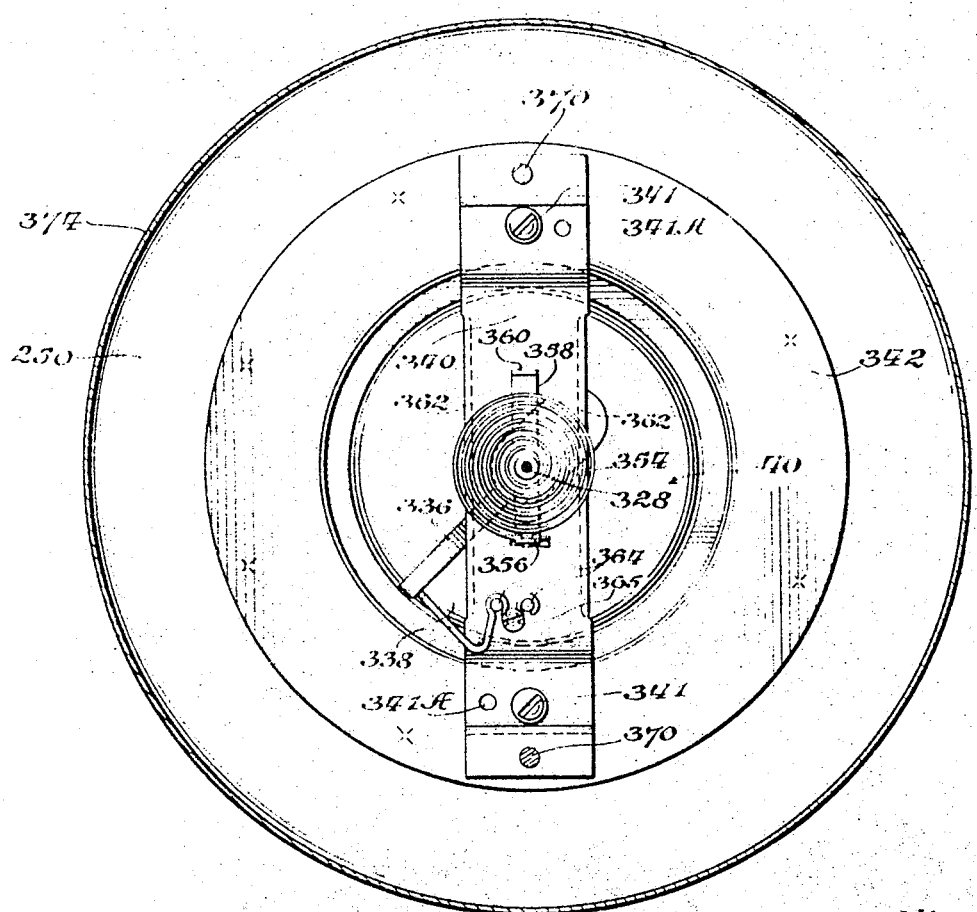
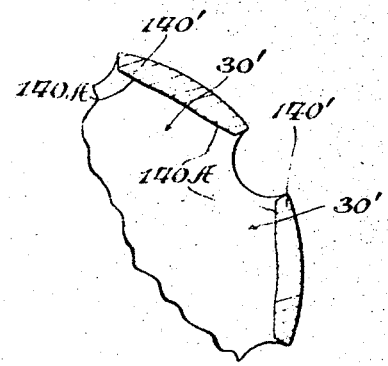
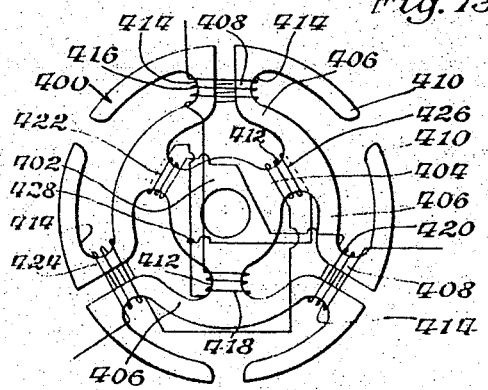

Patented Jan. 18, 1944

BEST AVAILABLE COPY 2,339,743

UNITED STATES PATENT OFFICE 2,339,743

ELECTRIC SPEEDOMETER

Horace M. Norman, Niles Center, Ill., assignor to Stewart-Warner Corporation, Chicago, Ill., a corporation of Virginia Application December 5, 1938, Serial No. 243,977

27 Claims. (Cl. 175—183)

The present invention relates to electric speedometers and is particularly concerned with the provision of a new and improved electric speedometer adapted to be installed as part of the standard factory equipment of an automotive vehicle.

It has long been recognized that electric speedometers possess a number of advantages that make their use in automotive vehicles desirable, particularly where the part of the vehicle from which the indication of speed is derived is located a considerable distance from the driver's compartment, as in rear-engined vehicles. Among the advantages of electric speedometers are the elimination of the flexible shaft of the ordinary mechanical speedometer with its attendant high cost, friction losses, rapid deterioration, very undesirable whipping action, and also the obtaining of a quicker response as well as more accurate readings. Another advantage of electric speedometers resides in the fact that the mileage indicator or odometer may be located at a distance from the speedometer, thereby making it possible to provide a more advantageous distribution of the indicators upon the instrument panel.

Despite the many advantages of electric speedometers, the latter have not been used extensively because of certain difficulties. One of the more important of these is the undesirable effect upon the indicator of variations in the potential of the battery from which the speedometers are supplied with electrical energy and of temperature variations.

One of the primary objects of the present invention is to provide a new and improved electric speedometer requiring no external source of energy, such as a battery.

Another of the primary objects of the invention is to provide a new and improved electric speedometer that is economical to manufacture, easy to install, easily calibrated to give accurate readings, and one that is not likely to get out of calibration despite the usage to which it is subjected.

A further object of the invention is to provide an electric speedometer having improved means adapted to compensate for the effect of ambient temperature variations and for the heating effect of the energizing current upon the various circuit elements.

A further object of the invention is to provide an electric speedometer with calibrating means whereby accurate readings may be obtained irrespective of slight variations in electrical and magnetic characteristics that may result in the course of manufacture of the speedometer. The calibrating means of my invention contributes considerably to the decreased cost of manufacture as well as the improved efficiency of the speedometer.

A further object of my invention is to provide a new and improved electric speedometer of relatively small size whereby the cost of manufacture is substantially reduced.

A more specific object of the present invention is to provide a new and improved electric speedometer consisting of a sending unit, comprising a fixed armature winding and a rotatable permanent magnet, adapted to generate a polyphase alternating current and an indicator unit adapted to be energized by the generated current comprising a fixed armature winding and an induction rotor rotatable thereby against a resilient restraining member.

Another object of my invention is to provide an electric speedometer with a new and improved polyphase alternating current generator or sending unit, as it may be more aptly termed.

Another object of my invention is to provide an electric speedometer with a new and improved electrically actuated indicator motor or indicator unit, as it may be more aptly termed.

Other objects and advantages of the present invention will become apparent from the ensuing description in the course of which reference is had to the accompanying drawings in which:

Fig. 3 is a horizontal cross sectional view taken along the line 3—3 of Fig. 1;

Fig. 4 is a partial vertical cross sectional view taken along the line 4—4 of Fig. 2;

Fig. 5 is a view similar to Fig. 4 taken along the line 5—5 of Fig. 2;

Fig. 6 is a transverse cross sectional view taken along the line 6—6 of Fig. 1;

Fig. 10 is a view similar to the two preceding figures taken along the line 10—10 of Fig. 7;

Fig. 12 is a top elevation view of a modified form of rotor adapted to be used with the sending unit to provide an improved alternating current wave form; and Fig. 13 is a plan view of a modified form of armature lamination adapted to be used in the indicator unit. The armature windings have been shown diagrammatically.

Before proceeding with a detailed description of the sending and indicator units of the present invention, it is deemed advisable briefly to describe the general nature of these units, the manner in which they are electrically connected to each other, and their location with respect to the odometer and its associated circuit. Certain features of the sending unit and of an odometer are disclosed and claimed in a divisional application, Serial No. 484,589, filed April 26, 1943, and certain features of the indicator unit are disclosed and claimed in a divisional application, Serial No. 484,590, also filed April 26, 1943.

Figure 11:
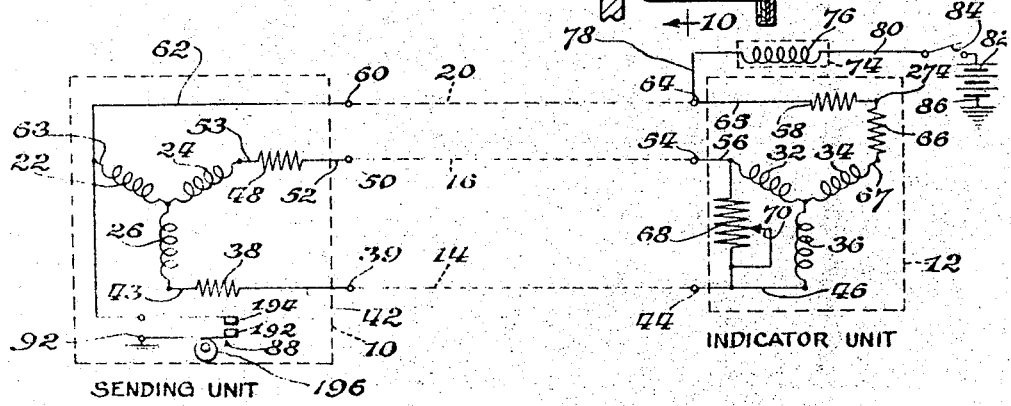
Fig. 11 is a diagrammatic representation of the electrical circuits embodied in the present invention and showing, in particular, the electrical connections between the sending unit, the indicator unit, and the odometer. The rotors associated with the two units have been omitted for purpose of simplicity since they are not conductively coupled to the illustrated electrical circuit.

Referring, therefore, to Fig. 11, it may be noted the sending unit has been indicated by reference character 10 and the indicator unit by reference character 12. These units are connected to each other by three inter-unit conductors 14, 16, and 20 of a length dependent upon the relative locations of the sending and indicator units. In rear-engined vehicles the sending unit is located at the rear of the vehicle and the indicator unit is located in the driver's compartment so that the indications may be readily observed by the operator. While the described arrangement is particularly suited for rear-engined vehicles, its use is not limited thereto, as it may be used just as well with a vehicle driven by an engine located at the forward end thereof.

The sending unit 10 is a polyphase, preferably a three-phase, alternating current generator comprising the star-connected fixed armature winding 22, 24, and 26. These windings have associated therewith a salient pole permanent magnet rotor 30 (see Figs. 1 and 3) rotated by suitable means at a speed bearing a constant relationship with the speed of the rear wheels of the vehicle, irrespective of whether the wheels are driven by the engine of the vehicle. The rotation of the rotor induces a three-phase alternating current in the armature windings that is supplied to the indicator unit through the previously mentioned conductors 14, 16 and 20.

Figure 7:
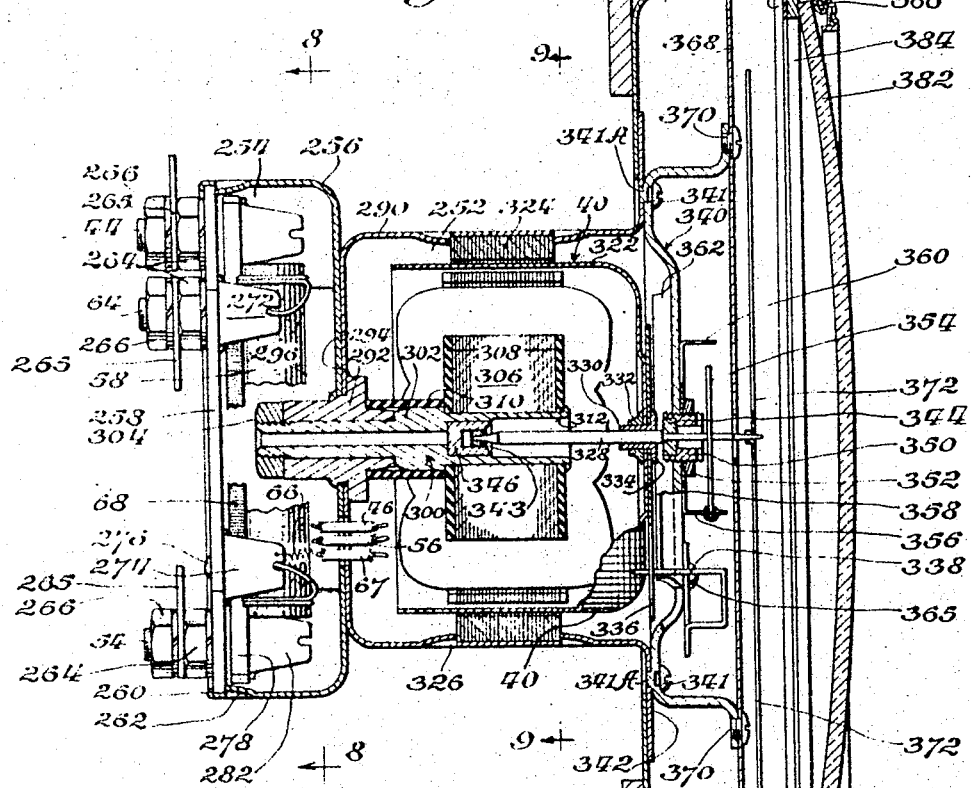
Fig. 7 is a vertical axial cross sectional view through the indicator unit.

The indicator unit also consists of three star-connected fixed armature windings 32, 34, and 36, which, when supplied with alternating current, produce a revolving magnetic field, in a manner well known to those skilled in the art. The revolving magnetic field effects rotation of an induction rotor 40 (see Fig. 7), hereinafter termed a speed cup, the rotation of which is restrained by resilient means such as a spiral hair spring in a manner to be described more definitely hereinafter. The torque exerted upon the speed cup is dependent upon the magnitude and frequency of the alternating currents generated by the sending unit, and since both these characteristics are dependent upon the speed of rotation of the permanent magnet rotor, it may be seen that the speed cup assumes a position dependent upon the speed of the vehicle.

The resistances of the armatures of both the sending and indicator units, as well as of the inter-unit conductors, are dependent upon the ambient temperature and the value of the current flowing therethrough. In order to compensate for the effect of these temperature changes a number of negative temperature coefficient series resistors are provided, and these have associated therewith a shunt connected positive temperature coefficient resistor which, as will be explained hereinafter, performs another function, namely, that of adjusting the reactance of the system. The negative temperature coefficient resistors are so located as to provide compensation even though the units may be located in regions where different temperatures obtain. For example, the sending unit may be located, as in the usual installation, in a location where it is subjected to outdoor temperatures which may range to a considerable value below zero degrees F. On the other hand, the sending unit may be driven from the transmission of a rear-engined bus, where the temperature may rise to a value of approximately 200 degrees F. The indicator unit, being located in proximity to the driver's compartment, is therefore in a region where the temperature remains in the neighborhood of 70 degrees F. The resistors are designed not only with physical and electrical characteristics such that they provide compensation for changes in in the resistance of the windings but to overcompensate therefor, and thereby provide temperature compensation for variations in the magnetism of the permanent magnet rotor of the sending unit and in the resistance of the induction type rotor of the indicator unit. Because of the nature of the negative temperature coefficient resistors which have a coefficient that decreases in the higher temperature ranges, it has been found desirable to utilize additional compensating means when the sending unit is located in a high temperature region, as near the engine of a rear-engined bus. The additional compensation is provided by a stationary annular ring surrounding the permanent magnet rotor of the sending unit made of metal having a characteristic such that its permeability is considerably greater at low temperatures than at high temperatures. Either Simonds or Monel metal has been found satisfactory.

Referring again to Fig. 11, it may be seen that the inter-unit conductor 14 is connected in series with a resistor 38 connected between winding 26 and terminal 39 by conductors 42 and 43. Conductor 14 is connected also to terminal 44 of the indicator unit and the latter is connected to winding 36 by a conductor 46.

Inter-unit conductor 16 is connected in series with resistor 48 connected between winding 24 and terminal 50 by conductors 52 and 53. Conductor 16 is connected also winding 32 of the indicator unit through a terminal 54 and conductor 56.

Inter-unit conductor 20 is connected in series with resistor 58, located in proximity to the indicator unit, as distinguished from the previously mentioned resistors 38 and 48 which are located in proximity to the sending unit for reasons to be considered in detail hereinafter. Inter-unit conductor 20 is connected to the third winding 22 of the sending unit through terminal 60 and conductors 62 and 63. Inter-unit conductor 20 is connected to the third winding 34 of the indicator unit through terminal 64, conductor 65, the previously mentioned resistor 58, a zero temperature coefficient calibrating resistor 66 and conductor 67.

Figure 8:
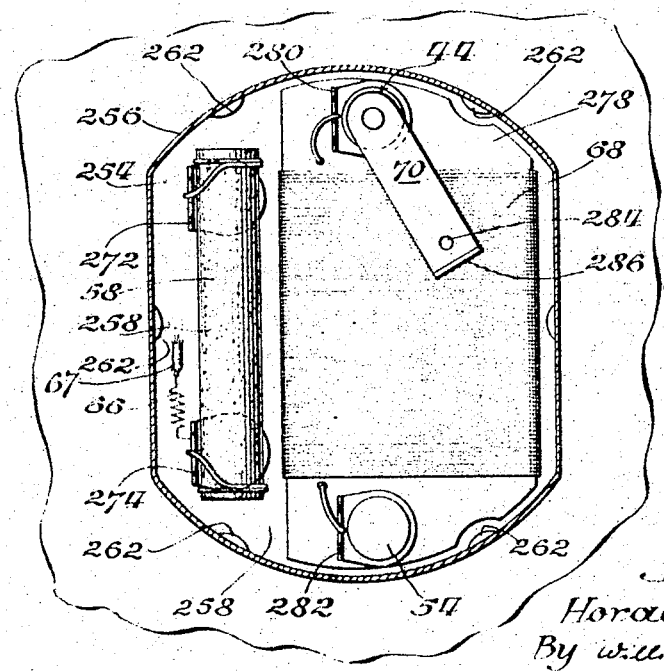
Fig. 8 is a vertical transverse cross sectional view of the indicator unit taken along the line 8—8 of Fig. 7.

Calibration of the indicator unit is effected by the calibrating resistor 66 and an adjustable positive temperature coefficient calibrating resistor 68 connected directly across the inter-unit conductors 14 and 16, i. e., in shunt to windings 32 and 36. The valve of the shunt resistance is controlled by an adjustable calibrating arm 70, one end of which is in electrical contact with terminal 44. (See Fig. 8). The manner in which calibration is effected by adjustment of the series and shunt resistors 66 and 68 to overcome slight variations in electrical and magnet characteristics resulting from manufacturing tolerances and variations in material is described in greater detail hereinafter.

The number of inter-unit conductors is reduced by utilizing inter-unit conductor 20 to conduct battery current utilized in actuation of the odometer 74, illustrated diagrammatically and comprising a solenoid 76. Since the odometer may be of the usual construction comprising a pawl and ratchet actuated counter and an actuating solenoid, the odometer has not been described or illustrated in detail. One terminal of the solenoid 76 is connected to inter-unit conductor 20 by a conductor 78 and the other terminal is connected by a conductor 80 to the usual battery 82, preferably through a switch 84 which may be the ignition switch controlling also, in a manner not shown, the other circuits of the vehicle. One terminal of the battery is grounded in customary manner, as indicated at 86.

The solenoid 76 is energized intermittently to actuate the odometer indicator through normally open cam actuated contact structure, indicated generally by reference character 88. One contact is connected to the inter-unit conductor 20 through the previously mentioned conductor 62 and the other grounded at 92. Each time the cam actuated contacts are brought together, a complete energizing circuit for the solenoid 76 is completed through a circuit including, in part, the ignition switch 84 (in its closed position), the inter-unit conductor 20, and the contacts. Since the battery supplies direct current, the battery current is effective only to operate the odometer because the sending and indicator units are both insulated from ground. It has been found that the battery current has no appreciable effect upon the reading of the speedometer.

The physical construction of the sending unit of my invention is illustrated in detail in Figs. 1 to 6, inclusive, to which reference is had in the ensuing detailed description thereof. The sending unit comprises a metallic base 100 detachably mounted upon an externally threaded boss 102, preferably a part of the transmission housing of the automotive vehicle, through which extends a shaft 104 rotating at a speed directly proportional to the speed of the vehicle. The sending unit comprises also a cup-like metallic housing 106 secured to the upper part of the base 100, as by the peening indicated by reference character 108. The housing is substantially sealed against foreign particles and the like by detachable rubber cover 110 provided with a relatively long tubular opening 112 for a cable 114 enclosing the inter-unit conductors 14, 16 and 20 which are connected, as previously described, to the terminal bolts 39, 50 and 60 of the sending unit.

The space defined by the cup-like housing 106 is subdivided into a generator compartment 112 and a resistor and odometer cam and contact compartment 114 by a relatively shallow metallic cup-like partition 116 inserted directly into housing 106. The upper ends of the cup-like members terminate in concentric outwardly extending flanges 118 and 120, whereby the two parts are readily held in fixed relationship with respect to each other by an annular bezel 122. The latter not only secures the two cup-like members together but also seals the upper end of the inner cup-like member 116 by a combined terminal and resistor plate 124, preferably made of some material such as Bakelite. A resilient sealing gasket 126 is interposed between the plate and the flange of the inner housing member.

The permanent magnet rotor 30 is fixedly secured to a vertically disposed rotatable shaft 128 by a relatively short nonmagnetic bushing 130 attached to an enlarged portion 132 of the shaft, as by a press fit. The rotor is held in place also by a shoulder 134 upon which it is seated and by the peened portion 136 of the bushing.

Figure 2:
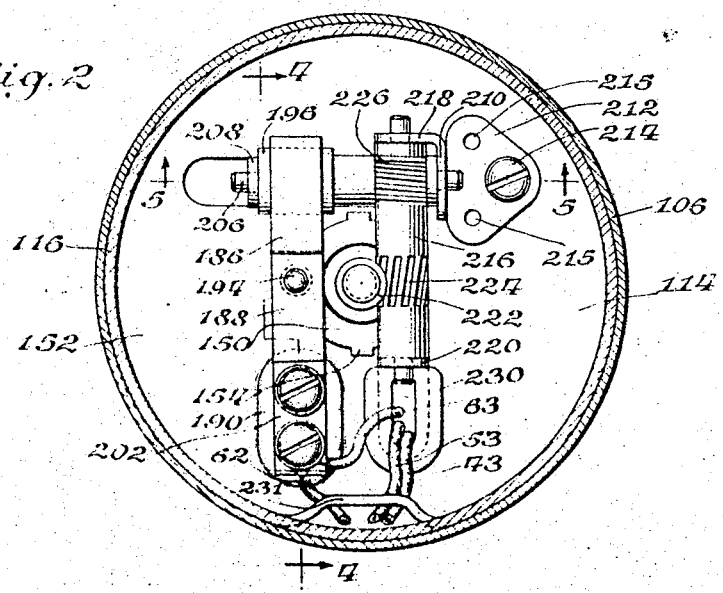
Fig. 2 is a horizontal cross sectional view taken along the line 2—2 of Fig. 1 illustrating in detail the cam operated switch controlling the odometer.
Figure 1:
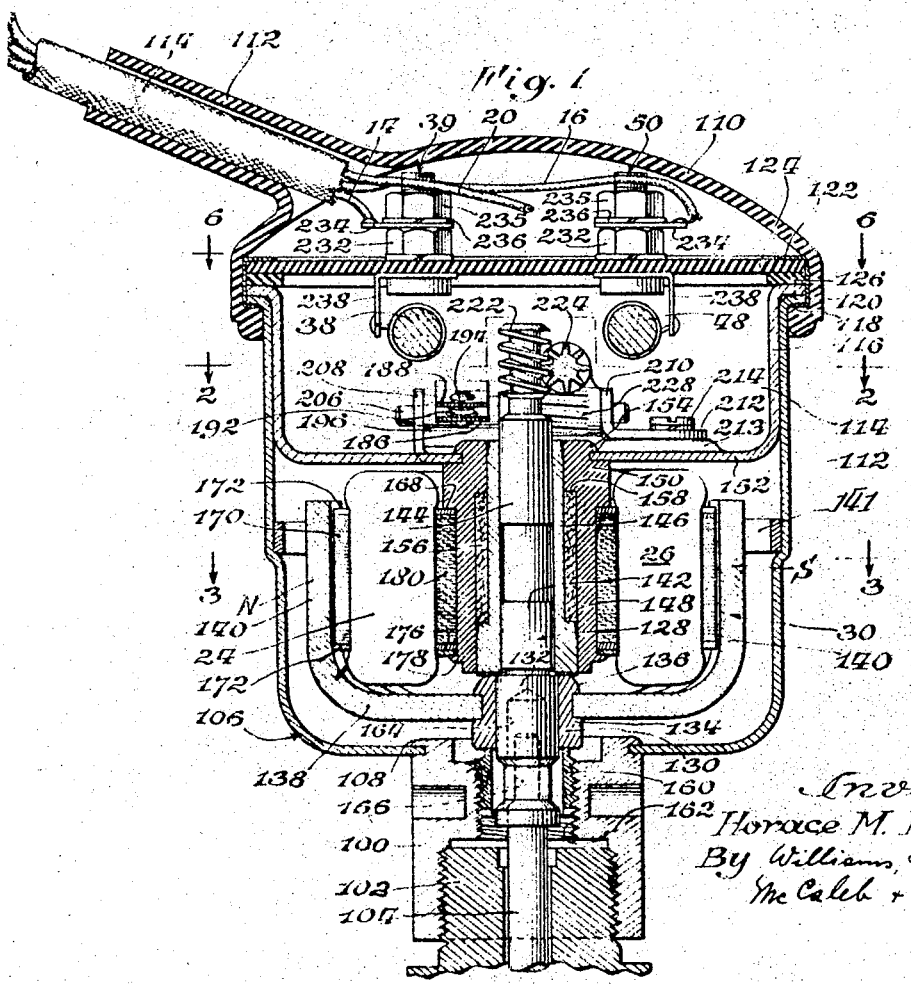
Fig. 1 is a vertical axial cross sectional view through the polyphase alternating current sending unit.

The rotor structure is illustrated best in Figs. 1 and 3, from which it may be seen to comprise an integral disc-like base portion 138 and a plurality of substantially axially extending spaced-apart poles 140. The rotor consists of six poles, all magnetized simultaneously to produce alternate North and South poles, as indicated by the reference characters N and S in Fig. 3. The rotor is preferably formed from a single flat piece of magnetic steel by punching and stamping operations and to insure proper positioning thereof with respect to the armature teeth, it is preferable that the inner axially facing surface thereof be ground and the bushing 130 drilled with respect to it. In this connection it may be noted it is easier to drill the bushing properly than the hard metal of which the magnet is made.

To provide the additional compensation necessary to overcome the decrease in the magnetism of the rotor at high temperatures there is provided a stationary annular ring 141 surrounding the upper ends of the rotor poles where it is supported by a step in the housing 106. It may be secured in place by a suitable adhesive. The ring may be made of Simonds or Monel metal or other metals the permeability of which decreases rapidly with an increase in temperature. The ring, it may be observed, acts to shunt a portion of the flux produced by the magnet, and the shunting effect is less at higher temperatures, whereby the additional compensation required to supplement the resistors is obtained.

The rotor shaft 128, which is provided with a pair of spaced-apart bearing surfaces 142 and 144, is journaled for rotation in a sleeve bearing 146 provided with a radially extending and upwardly facing shoulder 148 at its lower end. The bearing 146 is mounted in a bearing bushing 150 fixedly secured at its upper end to the bottom 152 of the inner cup-like member 116 as by the peening 154. The bearing is of the oilless type, and is lubricated substantially for its life by means of an annular oil-saturated felt sleeve 156 located in a space between the bearing 146 and bushing 150. The felt sleeve is seated upon the previously mentioned shoulder 148 and a centrally and downwardly extending shoulder 158 formed at the upper end of the bearing bushing 150.

The rotor shaft 128 is held against substantial axial movement by the lower end of the bearing 146 and an externally threaded bushing 160 which are provided with bearing surfaces adapted to engage the opposite ends of the rotor bushing 130. The bushing 160 is adjustably mounted in the centrally threaded aperture 162 in the base member 100 so that the end play of the shaft may readily be controlled. Bushing 160 is hollowed to receive the lower end of the shaft 128.

A quickly detachable driving connection between the magnet shaft and the driving member 104 is provided by a square hollow 164 at the lower end of the magnet shaft and a complementary square driving portion 166 at the upper end of the driving member 104.

The armature, which comprises the aforementioned windings 22, 24, and 26, is fixedly supported by the bearing sleeve 150 which is provided with an outwardly and downwardly facing shoulded 168 against which the armature laminations 170 and end insulators 172 are held by a washer 176 over which portion the lower end of the sleeve is peened, as indicated by reference character 178.

The armature laminations and likewise the insulating laminations 172 comprise an apertured central hub portion 180 and radially extending substantially T-shaped teeth 182 around which are coiled the various windings 22, 24, and 26. The flux densities in the armature are relatively low and the teeth may therefore be made relatively narrow, as illustrated. This results in a decrease in the amount of wire required. From Fig. 3 where the lamination structure is best illustrated, it may be seen that there are nine teeth and, therefore, since it is preferred that a three-phase winding be utilized, every third coil is connected to form a phase winding. The end terminals of all three phases are connected together in a manner well known to those skilled in the art to form the neutral connection of a star-connected armature and the remaining terminals are brought out to the sending unit terminals, as described previously in connection with Fig. 11. A substantially sinusoidal wave form is provided by the illustrated construction of stator teeth and rotor illustrated and described above. Good results have been obtained by utilizing the specified number of permanent magnet poles and armature windings and by making the clearance between the magnet and armature teeth about .015 inch.

An improved wave form is obtainable by slightly tapering the inner edges of the permanent magnets 140, as illustrated in Fig. 12. In this figure the rotor is indicated by the reference character 30' and the permanent magnet poles by the reference characters 140'. The inner edges 140A of each magnet 140' are tapered slightly to provide a more desirable flux distribution and thereby provide an improved wave form. It may be noted that tapering the inner edges of the magnets affects the flux distribution the same as changes in the form of the armature teeth.

The odometer circuit controlling contacts are mounted in the resistor and odometer cam and contact compartment 114 which is defined, it may be remembered, by the inner cup-like housing. The contact structure comprises a pair of resilient arms 186 and 188 supported upon a raised platform 190 suitably stamped from the bottom 152 of the inner housing. The arms carry opposed tungsten contacts 192 and 194 and the arms are so positioned with respect to each other that they normally are spaced apart to open the odometer actuating circuit, as indicated in Figs. 4 and 11. The lower arm 186 is made substantially longer than the upper arm in order that it may be moved upwardly into circuit closing position by a cam 196 rotated at a speed proportional to that of the magnet shaft and, therefore, proportional to that of the vehicle through gearing to be described shortly. The lower arm 186 is positioned in electrical contact with the inner casing 116 and is, therefore, grounded through the latter. The two contact carrying arms are insulated from each other and from their securing screws 198 by a pair of insulators 200 and 202 having bosses surrounding the screws. The upper arm has its rear end bent at an angle upwardly, as indicated at 204, to provide a terminal for the conductor 62.

The contact actuating cam 196, which is preferably made of some suitable insulating material, is affixed to a cam shaft 206 journaled for rotation in a pair of upstanding apertured brackets 208 and 210. The bracket 208 is formed by pressing up a portion of the bottom of the inner housing 116 and the bracket 210 is preferably a right angled bracket, the horizontal portion 212 of which is mounted upon a raised platform 213 stamped from the bottom 152 to which it is secured by screw 214 in a position determined by a pair of dowels 215.

The cam shaft 206 is rotated by a shaft 216 mounted above and at right angles thereto in a bracket 218 formed integrally with the bracket 210—212 and upon a punched-up bracket 220. Rotation of the magnet shaft 128 is transmitted to the cam shaft through (1) worm gearing 222 formed at the upper end of the magnet shaft, and helical gearing 224 co-operatively associated therewith and formed intermediate the ends of the shaft 216; and (2) worm gearing 226 formed at the end of shaft 216, and helical gearing 228 formed upon an enlarged portion of the cam shaft 206.

The armature windings 26, 24, and 22 are connected by conductors 43, 53, and 63 to resistors 38, 48, and to conductor 62, respectively. Conductors 43, 53, and 63 are brought out from the compartment 112 through the opening left by the punching of bracket 220, and are insulated from the metal of the inner housing 116 by a rubber grommet 230 (see Fig. 2). Conductors 43, 53, and 62 are prevented from being entangled with the gears in compartment 114 by a bracket 231 punched out from the side wall of housing 116 (see Figs. 2 and 4).

The combined terminal and resistor carrying insulator plate 124 supports the previously mentioned terminal bolts 39, 50 and 60, which are secured thereto by means of a plurality of lock washers and nuts 232. The inter-unit conductors terminate in apertured terminals 234, which are securely fastened to the terminal bolts by nuts 235 and suitable lock washers 236. The terminal bolts are provided with enlarged heads better to enable the attachment of a pair of resistor terminals 238, by bolts 39 and 50, to which ends of the negative temperature coefficient resistors are attached. The opposite ends of the resistors are supported by similar terminals 240 secured to the insulating plate by rivets 242 (see Figs. 1, 4 and 6).

The physical construction of the indicator unit is illustrated in detail in Figs. 7 to 10, inclusive. From Fig. 7 it may be seen that the unit is divided into three compartments, namely, an indicator compartment 250, an armature and rotor compartment 252, and a combined terminal and resistor compartment 254. Each of the compartments is formed of a centrally apertured cup-like housing suitably attached to the other housings, as by welding.

The combined terminal and resistor housing 254 comprises a cup-like member 256 having flattened sides, the open end of which is closed by an insulating plate 258 to which are secured the terminal bolts 44, 54, and 64. The plate, which has a shape corresponding to that of the member 256, is secured to the latter by bent-over fingers 260 and indentations 262 adapted to engage opposite sides of the peripheral portion of the plate. The terminal bolts are secured to the plate by lock washers and nuts 264 and the conductor terminals 265 are secured to the bolts by lock washers and nuts 266.

The negative temperature coefficient resistor 58 is supported upon a pair of terminals 272 and 274. The former is secured in position by the terminal bolt 64 and the latter by a rivet 276 extending through the insulating plate 258. The resistor is connected to these terminals by suitable conductors in electrical conducting relationship with the resistor and the terminals.

The calibrating resistance 68 is preferably wound around a relatively wide strip 278 of insulating material spaced from the closure plate 258 and secured in place by the terminal bolts 44 and 54. The ends of the resistor are connected to terminals 280 and 282, respectively, which are in electrical conducting relationship with the terminal bolts 44 and 54. The calibrating arm 70 is pivotally mounted for rotation upon the terminal bolt 44 and is adapted, when rotated, to vary the resistance in shunt across the terminals 44 and 54 within desired limits, as necessitated by the electrical and magnetic characteristics of the indicating and sending units. The calibrating arm is provided with a silver contact 284 opposite the pivot end and with an upwardly extending lug or projection 286 whereby it may be readily rotated.

A length of resistance wire 66, having a substantially zero temperature coefficient of resistance, is attached at one end to the terminal 274 and at the other to the conductor 67 which leads to winding 34 of the fixed armature.

The armature and rotor unit 252 consists of a casing 290, the transverse portion of which is spot welded to the transverse portion of casing 256. The bottoms are apertured centrally to receive a hollow bushing 292 provided with an outwardly facing shoulder 294 upon which the transverse portions of the housings 256 and 290 rest and to which the latter are secured, as by the peening 296.

The armature, which comprises the fixed windings 32, 34, and 36, is mounted upon an armature shaft 300 made hollow for a reason appearing shortly, and provided with an intermediate enlarged portion 302 providing a shoulder abutting against one end of the bushing 292. The armature shaft is detachably secured to the bushing by a nut 304 threaded onto the left end thereof. The other end of the enlarged portion 302 provides a shoulder upon which the armature laminations 306 and a pair of end insulator laminations 308 are supported. An insulating bushing 310, one end of which rests against shoulder 294 of the bushing, serves to insulate the armature windings from the shaft. The right end of the armature shaft is provided with an enlarged hollow opening 312, the extreme end of which is peened over to secure the laminations in place.

Figure 9:
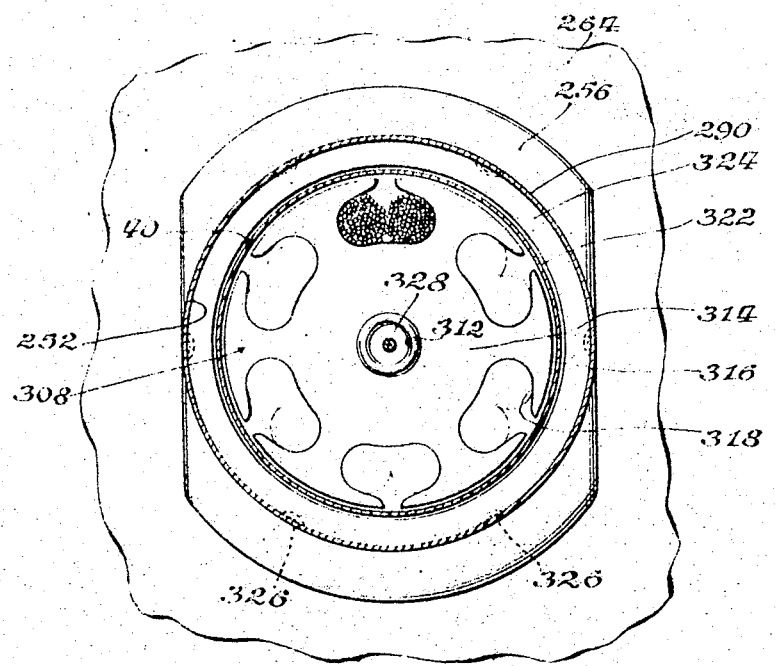
Fig. 9 is a view similar to Fig. 8 taken along the line 9—9 of Fig. 7.

The shape of the armature laminations is best illustrated in Fig. 9 from which they may be seen to comprise a central hub portion 314 and radially extending generally T-shaped teeth 316 defining spaced-apart substantially elliptical slots 318.

The armature windings 32, 34 and 36 are distributed in the slots, which are six in number, and each phase winding comprises a pair of series connected coils. The coils for one phase winding lie in slots 1, 3 and 4, 6, if it be assumed that the slots 318 are numbered consecutively from 1 to 6 in a clockwise direction, as viewed in Fig. 9. The coils for the second phase winding lie in slots 2, 4 and 5, 1, and the coils for the third phase winding lie in slots 3, 5 and 4, 2. The windings are so disposed that, when supplied with a three-phase alternating current from the sending unit, a two-pole revolving magnetic field is produced in a manner well known to those skilled in the art. This revolving field induces rotation of the previously mentioned speed cup 40 provided with a relatively long portion 322 lying axially of the armature and spaced about .020 inch therefrom.

Laminations 324, concentrically arranged with respect to the armature laminations and surrounding a part of the axial portion of the speed cup, provide a return path for the magnetic flux set up by the armature winding. The laminations are spaced about .020 inch from the speed cup and are held in fixed position by indented portions 326 of the housing 290, which engage the opposite sides of the assembled laminations.

The speed cup is mounted upon a rotatable indicator shaft 328 by a flanged bushing 330 securely affixed to the shaft and a bushing 332 pressed upon the former. Rotation of the speed cup may be limited by a stop 336 mounted for rotation with the latter by the opposed flange 334 and bushing 332, and co-operatively associated with a fixed but slightly resilient piano wire stop 338 secured to a relatively narrow indicator shaft and dial support 340 attached to a peripheral radial flange 342 formed integrally with the casing 290 by screws 341 in a position determined by dowels 341A.

The speed cup stops 336 and 338 may be eliminated, if desired, by proper selection of hair spring. The spring could be strong enough to prevent rotation of the speed cup more than a full rotation from its normal position. The elimination of the stop avoids certain inaccuracies at the lower speeds when the stops are moved out of engagement with each other, when they have a tendency to stick together, and when moved, move with a sudden jerk.

The indicator shaft is journaled for rotation in spaced-apart combined guide and thrust bearings 343 and 344 mounted in the armature shaft 300 and in the support 340, respectively. The bearing 343 is mounted in a cup 346 fitted into the enlarged opening 312 in the armature shaft so that it may be easily removed therefrom by a suitable tool fitting into the smaller opening at the other end of the shaft. The bearing 344 is mounted in a bushing 350 threaded into the support 340 and secured in place upon the latter by a nut 352.

The rotation of the speed cup is restrained by a spiral hair spring 354, one end of which is attached to the indicator shaft and the other to an axially extending projection 356 of an adjustable spring adjuster 358. The latter is mounted for rotation about the nut 352, and may be rotated readily by an axially extending projection 360. The hair spring 354 is effective to return the shaft to its normal position when the armature of the indicator unit is not supplied with an alternating current from the sending unit.

The front bearing and dial support 340 is made relatively rigid by bending portions 362 thereof rearwardly. The speed cup stop 338 is attached to the support by a pair of dowels 364 and a screw 365.

The indicator dial 368 is attached to the opposite ends of support 340 by a pair of screws 370. The dial is apertured centrally so that the shaft may extend therethrough, and an indicator needle 372 is mounted upon the projecting end of the shaft. The dial is provided with suitable indicia, not shown, so that the needle indicates the speed of the vehicle as determined by the position of the speed cup.

The indicator compartment is formed by a cup-like housing 374 spot welded to the flange 342 of housing 290 and terminates in an outwardly extending peripheral flange 376. An annular ring 378 having a flange similar to the flange 376 is held in fixed relationship with the flange by a bezel 380, which acts also to hold in place the usual dial glass 382. The glass 382 is resiliently held in place between a relatively solid annular gasket 384 and a hollow gasket 386.

The indicator unit as a whole may be mounted upon a suitable support, such as the instrument panel of an automobile (not shown) by a plurality of extensions 390 welded to the housing 374.

The armature windings of the above-described modification extend a substantial distance beyond the ends of the armature laminations. This difficulty can be avoided by utilizing the novel form of armature illustrated in Fig. 13. Referring now to this figure, it may be seen that the windings are shown diagrammatically upon an armature lamination 400. The important features of the illustrated construction are a decrease in the length of wire required and in the distance the windings extend beyond the ends of the laminations. These advantages are the result of locating the coils comprising the various phase windings so that no coil need be wound over another, as in the previously described construction.

The armature laminations comprise an apertured central hub portion 402 and three identical radially extending portions 404 dividing into opposed arcuate branches 406. The branches 406 extend radially outward, as indicated by reference characters 408, and terminate in arcuate peripheral portions 410 facing each other. The described armature laminations define two radially spaced apart groups of slots 412 and 414. The former are positioned adjacent the hub and the latter between the former and the peripheral portion.

Each phase winding comprises a coil surrounding an inner radial portion 404 of the armature laminations and one surrounding adjacent radial portions 408, the coils for one armature winding being indicated by reference characters 416 and 418, for a second by 420 and 422, and for the third by 424 and 426. Like ends of the windings are joined together to form the neutral connection 428. The various coils and phase windings are connected so as to produce a revolving magnetic field when they are supplied with three-phase alternating current, substantially as indicated in Fig. 13.

Among the noteworthy advantages of my invention may be mentioned the simplicity of manufacture of the various parts and the assembly thereof to form both the sending and indicator units. The various resistors and terminals are adapted to be mounted upon an insulating closure plate easily attached to its associated unit. The armatures and armature windings are readily assembled as sub-units with their associated shafts and these units are easily attachable to their respective housings. The rotors of the indicator and sending units are also easily assembled as sub-units which may be readily positioned with respect to the other sub-units.

In operation the various windings and resistors of the indicator unit, the sending unit, and the odometer are connected electrically, as indicated in Fig. 11. When so connected and the permanent magnet rotor shaft 128 is connected to the transmission by means of the driving member 104 and the ignition switch 84 closed to complete the odometer circuit, then, when the automotive vehicle moves, the permanent magnet rotor is rotated at a speed proportional to that of the vehicle to induce a polyphase alternating current in the fixed armature of the sending unit. This polyphase alternating current is transmitted to the indicator unit over the three inter-unit conductors 14, 16 and 20. The polyphase alternating currents flow through the fixed armature of the indicator unit and produce a revolving field which induces rotation of the speed cup with a torque dependent upon the speed of the vehicle. Rotation of the speed cup is resisted by the spiral hair spring so that the speed cup assumes a position dependent upon the speed of the vehicle.

The described arrangement produces a deflection of the indicator needle that is not exactly a straight line relation to the speed of the vehicle, but the scale is so designed that a proper indication of the speed is given at all times. The deflection of the indicator needle per unit change in speed decreases gradually at the higher and lower speeds.

The odometer 74 is actuated intermittently when the vehicle moves and when the ignition switch 84 is closed, as it ordinarily is when the vehicle is moving. Each time the cam 196 effects engagement of contacts 192 and 194, the solenoid is energized through a previously described circuit which includes the battery 82 and the inter-unit conductor 20. The direct current flowing through this circuit has no appreciable effect upon the armature windings or upon the reading of the speedometer.

The permanent magnet rotor of the sending unit is preferably rotated at a speed of 2,000 R. P. M. when the vehicle is traveling at a rate of 60 M. P. H. This speed is, as known to those skilled in the art, approximately twice as fast as the speed of the permanent magnet rotor of a mechanical speedometer. Rotation of an integral permanent magnet rather than of a wound armature eliminates slip rings and brushes with their attendant wear, variable resistances and the like, and also the likelihood of the windings being deleteriously affected by long continued rotation at high speeds.

While I have described an arrangement wherein the sending unit comprises a rotor having six poles and an armature winding comprising nine teeth, each of which is encircled by 100 turns of No. 26 double enamelled wire and adapted to be rotated at speeds indicated above, these values may be modified. The indicator unit associated with the sending unit comprises an armature, the phase windings of which each consist of two series connected coils each having 86 turns of No. 26 double enamelled wire. The phase windings of the sending unit armature have a resistance of about two ohms, measured from terminal to neutral and those of the receiving unit have substantially the same resistance.

The described construction and arrangement of the sending unit provides a substantially sinusoidal wave form. However, slight variations from a sine wave do not materially affect the operation of the speedometer as a whole, because the higher harmonics do not exert a substantial torque because of their high frequency. It is this factor, that is, the increase in torque with increase in frequency (up to a certain value of frequency and for further increases in frequency a decrease in torque), which governs the sending unit rotor speed. It is not desirable to increase the fundamental frequency of the generated current to high.

The negative temperature coefficient resistors may all have identical values, but since the manufacturing processes by which they are made produce slight variations the resistor 58 at the receiving unit is chosen to have a resistance of approximately four ohms while the resistors at the sending unit have values of about four and five ohms. The zero temperature coefficient compensating resistor 66 has a value of approximately two ohms and the positive temperature coefficient resistor has a total value of about thirty-two ohms and may be varied from this value to about twenty-two ohms by the calibrating arm 70. The various resistors may be made from suitable materials presently available on the market.

The negative temperature coefficient resistors and the positive temperature coefficient shunt resistor function to maintain substantially balanced the resistances of the armature windings, irrespective of variations in their resistance because of changes in ambient temperature and of changes in temperature resulting from variations in current flow. The negative temperature coefficient resistors have substantially the same physical proportions, and when located as described, i. e., two at the sending unit and one at the indicator unit, then uniform results are obtainable when both units are located in regions where the temperatures are in the neighborhood of zero or 70 degrees F., or when the sending unit is in a region of zero degrees F. and the indicator unit in a region of 70 degrees F., as in the usual automobile installation. The locations could be changed, and compensation provided by varying the values of the resistances, but this would create unbalanced current conditions and these unbalanced conditions would result in inaccuracies because the result of an unbalance may, in effect, be divided into opposing torques on the induction rotor resulting in inaccurate readings. Small unbalances, it has been found, do not materially affect the readings.

The negative temperature coefficient resistors at the sending unit are designed to overcompensate for variations in resistance of the windings because of temperature changes, i. e., they decrease the resistance somewhat more than the resistance is increased by a rise in temperature, and vice versa. The effect of this overcompensation is to provide compensation for the effect of temperature changes upon the magnetism of the permanent magnet rotor, which decreases with an increase in temperature. A decrease in the strength of the magnetism upon an increase in temperature results in a decrease in the magnitude of the current but, since the resistance of the negative temperature coefficient resistors decreases more than enough to compensate for the decrease in magnitude resulting from an increase in the temperature of the windings, compensation is provided for the decrease in magnetism.

Negative temperature coefficient resistors now available on the market (having a resistance of 4 ohms plus or minus 10 per cent at 70 degrees F. and exhibiting a negative resistance change of .8 ohm plus or minus 10 per cent for a temperature change from 0 to 100 degrees F.) as well as the usual negative temperature coefficient resistors made of carbon or carbon compounds exhibit a characteristic that varies with the range in temperature. At lower temperatures the unit change in resistance per unit change in temperature is comparatively greater than at high temperatures. It has been found that when the sending unit is placed in a region of 200 degrees F., the aforementioned resistors obtainable on the market do not provide sufficient compensation. An excellent way to provide the additional compensation is by utilizing the annular fixed ring 141, the magnetism of which decreases with increases in temperature sufficiently to provide the desired additional compensation. Since the magnetism is greater at lower temperatures than at higher, more of the flux available from the permanent magnet rotor is shunted from the armature windings at lower than at higher temperatures, i. e., as the temperature increases the decrease in the strength of the permanent magnet is compensated for by decreasing the amount of flux shunted by the ring.

It should be observed that the ring may be used, not only in conjunction with the negative temperature coefficient resistors, but also in place thereof. By properly choosing a ring it may be made to overcompensate, that is, increase the effective magnet strength more than it is decreased by a change in temperature, and vice versa, thereby to compensate, at least in part, for changes in resistance of the armature winding.

The negative temperature coefficient and positive temperature coefficient resistors 58 and 66 at the indicator unit are also designed conjointly to effect similar overcompensation for resistance variations and thereby compensate for variations in the resistance of the induction type rotor occasioned by temperature changes. The action of resistor 58 is the same as that of the resistors heretofore described. The shunt resistor, even though it has a positive coefficient, actually exhibits the characteristics of a negative temperature coefficient resistor because of its location in the circuit. When the temperature increases, its resistance increases so that a lesser portion of the total current flows through it, thereby to increase the portion of the current flowing through the armature winding.

The shape of the deflection-speed curve of the indicator unit is governed by the ratio of the resistance to the reactance in the circuit as a whole. This ratio can be adjusted by varying the values of the series resistance 66, the variation of which has no effect upon the reactance, and of the shunt resistance 68, the variation of which is apparently the equivalent of a change in resistance and reactance of the circuit. Consequently, it is possible readily and properly to calibrate the indicator for various types of hair springs as well as for variations in the physical construction of units, which determine the reactance of the system.

Ordinarily, calibration may be effected at three points, at a minimum point of 10 M. P. H., where the indicator becomes effective, an intermediate point of 30 M. P. H., and at a high point of 60 M. P. H. The first calibration is governed by the hair spring and stop location, and the two others are obtained by selective variation of the two resistors to make the deflection-speed curve pass through the proper points—i. e., to make the indicator read 30 and 60 M. P. H. when the vehicle is moving at these speeds.

While I have indicated my invention is applicable for indicating the speeds of automobiles, it should be understood that this is its preferred use and that the indicator may be utilized to indicate the speeds of other moving objects. However, there are particular advantages that make the invention peculiarly adapted for use in vehicles.

Having thus described my invention, what I claim as new and desire to secure by Letters Patent is:

1. In an indicator, the combination including, indicating means, electromagnetic means comprising an armature winding having a positive temperature coefficient of resistance for operating said indicating means, a source of electrical energy including an armature winding having a positive temperature coefficient of resistance connected in circuit with said first-mentioned armature winding for said electromagnetic means, and negative temperature coefficient means in circuit with said armature windings adapted to compensate for variations in resistance of the circuit occasioned by ambient temperature and current variations.

2. In an indicator, the combination including, indicating means, electromagnetic means comprising a polyphase armature winding for operating said indicating means, a source of electrical energy including a polyphase armature winding connected in circuit with said first-mentioned armature winding for said electromagnetic means, said windings having positive temperature coefficients of resistance and balanced impedances, and negative temperature coefficient resistance means in series with each of the interconnected phase windings adapted to compensate for variations in resistance of the circuit occasioned by ambient temperature and current variations for maintaining balanced current conditions in the system.

3. In a speed indicator for automotive vehicles, the combination including, indicating means located in proximity to the driver's compartment, electromagnetic means comprising a three-phase armature winding for operating said indicating means, said electromagnetic means being located in proximity to said compartment, a source of electrical energy including a three-phase armature winding connected in circuit with said first-mentioned armature winding for said electromagnetic means, said last-mentioned armature winding being located at a distance from said other winding and in proximity to the vehicle engine, and negative temperature coefficient resistance means in circuit with said windings adapted to compensate for variations in the resistance thereof, certain of said resistance means being located in proximity to certain ones of said armature windings.

4. In a speed indicator for automotive vehicles, the combination including, indicating means located in proximity to the driver's compartment, electromagnetic means comprising a three-phase armature winding for operating said indicating means, said electromagnetic means being located in proximity to said compartment, a source of electrical energy including a three-phase armature winding connected in circuit with said first-mentioned armature winding for said electromagnetic means, said last-mentioned armature winding being located at a distance from said other winding and in proximity to the vehicle engine, and a negative temperature coefficient resistor in series with each of the interconnected phase windings adapted to compensate for variations in resistance of the windings, one of said resistors being located in proximity to the first-mentioned armature winding and the other two in proximity to the second-mentioned armature winding.

5. In an indicator, the combination including, indicating means, operating means therefor comprising a polyphase armature winding, means including a second polyphase armature winding connected to said first-mentioned winding for supplying the latter with energizing current, and resistance means electrically connected in shunt circuit relation with said windings for adjusting the reactance of the system.

6. In an indicator, the combination including, indicating means, operating means therefor comprising a polyphase armature winding, means including a second polyphase armature winding connected to said first-mentioned winding for supplying the latter with energizing current, and adjustable resistance means in shunt and series circuit relation with said windings for varying the effective resistance and reactance of the system.

7. In an indicator, the combination including, indicating means, operating means therefor comprising a star-connected three-phase armature winding, means including a second star-connected three-phase armature winding connected to said first-mentioned winding for supplying the latter with energizing current, and means electrically connected in circuit with said windings for adjusting the effective resistance and reactance of the system, said means including a resistor connected in series with one phase winding of each armature and another connected across the two remaining phase windings of the armatures.

8. In an indicator, the combination including, indicating means, operating means therefor comprising a star-connected three-phase armature winding, means including a second star-connected three-phase armature winding connected to said first-mentioned winding for supplying the latter with energizing current, and means electrically connected in circuit with said windings for adjusting the effective resistance and reactance of the system, said means including a fixed resistor connected in series with one phase winding of each armature and an adjustable resistor connected in shunt across the remaining phase windings of the armatures.

9. In apparatus of the type described, the combination including, an indicator unit comprising a star-connected three-phase armature winding, a source of alternating current therefor comprising a similar winding connected thereto, and means including a zero temperature coefficient resistor in series with only one phase connection for controlling the resistance of the circuit.

10. In apparatus of the type described, the combination including, an indicator unit comprising a star-connected three phase armature winding, a source of alternating current therefor comprising a similar winding connected thereto, and means including a resistor connected in shunt relation across two phase windings of the armatures for controlling the reactance of the circuit.

11. In apparatus of the type described, the combination including, an indicator unit comprising a fixed star-connected three-phase armature winding, an annular induction type rotor adapted to be actuated thereby and an annular field surrounding the latter, a source of alternating current for energizing said armature winding to effect rotation of the rotor including a similar armature winding connected to the first-mentioned winding and a permanent magnet rotor rotatable thereabout at a speed proportional to a characteristic to be indicated, and means for varying the proportion of resistance to reactance in the circuit, said last-mentioned means including a resistor connected in series with one set of interconnected phase windings, and an adjustable resistor connected across the remaining sets of intercononected phase windings.

12. In an indicator, the combination including, indicating means, electromagnetic means comprising an armature winding for operating said indicating means, a source of electrical energy for said electromagnetic means, said source including an armature winding and a cooperating magnetic flux producing rotor, said windings having positive temperature coefficients of resistance, and negative temperature coefficient resistance means located in proximity to the second-mentioned armature winding so constructed and arranged as to overcompensate for the effect of temperature changes upon the resistance of the system, whereby said resistance means are effective to compensate for the effect of temperature changes upon said rotor.

13. In an indicator, the combination including, indicating means, electromagnetic means comprising an armature winding and an induction type rotor adapted to be rotated thereby for operating said indicating means, a source of electrical energy for said electromagnetic means including an armature winding connected in circuit with said first-mentioned armature winding, said windings having positive temperature coefficients of resistance, and negative and positive temperature coefficient resistance means located in proximity to said electromagnetic operating means for compensating for variations in the resistance of the circuit occasioned by ambient temperature and current variations, said resistance means being so constructed and arranged as to overcompensate for the effect of temperature variations upon the resistance of said system, whereby said resistors are effective to compensate for the effect of temperature changes upon said induction type rotor.

14. In an indicator, the combination including, indicating means, electromagnetic means comprising a star-connected three-phase armature winding and a rotatable induction type rotor for operating said indicating means, a source of electrical energy for said armature winding including a star-connected three-phase armature winding connected in circuit with the first-mentioned armature winding and a permanent magnet rotor adapted to be rotated at a speed proportional to a characteristic to be indicated, said windings having positive temperature coefficients of resistance, and negative temperature coefficient resistance means in series with each of the interconnected phase windings adapted to compensate for variations in the resistance of the circuit occasioned by ambient temperature and current variations, two of said resistance means being located in proximity to the second-mentioned armature winding and the third in proximity to the first-mentioned armature winding, said two resistance means being so constructed and arranged as to overcompensate and said one as to undercompensate for variations in resistance resulting from temperature changes.

15. In an indicator, the combination including, indicating means, electromagnetic means comprising a star-connected three-phase armature winding and a rotatable induction type rotor for operating said indicating means, a source of electrical energy for said armature winding including a star-connected three-phase armature winding connected in circuit with the first-mentioned armature winding and a permanent magnet rotor adapted to be rotated at a speed proportional to a characteristic to be indicated, said windings having positive temperature coefficients of resistance, negative temperature coefficient resistance means in series with each of the interconnected phase windings adapted to compensate for variations in the resistance of the circuit occasioned by ambient temperature and current variations, two of said resistance means being located in proximity to the second-mentioned armature winding and the third in proximity to the first-mentioned armature winding, said two resistance means being so constructed and arranged as to overcompensate and said one as to undercompensate for variations in resistance resulting from temperature changes, and positive temperature coefficient resistance means connected across the two remaining phase windings of said first-mentioned armature winding, whereby the combined effect of said one negative temperature coefficient resistance means and said positive temperature coefficient resistance means overcompensates for variations in resistance resulting from temperature changes, said overcompensation being effective to compensate for the effect of temperature changes upon said rotors.

16. In an indicator, the combination including, indicating means, electromagnetic means including an induction type rotor and a polyphase armature winding for operating said indicating means, and a polyphase current generator for supplying said electromagnetic means with current having substantially a pure sine wave form, said generator including a fixed polyphase star-connected armature winding comprising spaced apart substantially T-shaped tooth defining laminations, and a permanent magnet rotor having spaced apart generally rectangular poles extending axially of the rotor shaft and in the direction of the teeth, the armature facing surface of the rotor being substantially cylindrical, and the peripheral portions of the tooth defining laminations being curved to a radius of curvature less than the radius of curvature of the inner surface of the rotor.

17. In apparatus of the type described, the combination including, an alternating current generator including an armature winding and a cooperating magnetic flux producing rotor, said winding having a positive temperature coefficient of resistance, and negative temperature coefficient resistors located in proximity to said winding so constructed and arranged as to overcompensate for the effect of temperature changes upon the resistance of the winding, whereby said resistors are effective to compensate for the effect of temperature changes upon said rotor.

18. In an indicator, the combinaiton including, an alternating current generator including in combination an armature winding and a cooperating magnetic flux producing rotor, said winding having a positive temperature coefficient of resistance, and a substantially fixed annular ring made of metal having a characteristic such that its magnetism decreases substantially upon increases in temperature, and vice versa, in proximity to said flux producing rotor to compensate for the effect of temperature changes upon the magnetism of said rotor.

19. In an indicator, the combination including, an alternating current generator comprising an armature winding and a cooperating magnetic flux producing rotor, said winding having a positive temperature coefficient of resistance, and a substantially fixed annular ring made of metal having a characteristic such that its magnetism decreases substantially upon increases in temperature, and vice versa, in proximity to said flux producing rotor to compensate for the effect of temperature changes upon the magnetism of said rotor, said ring being so constructed that it overcompensates for the changes in magnetism of said permanent magnet rotor whereby it compensates, at least in part, for variations in the resistance of said winding resulting from changes in the temperature thereof.

20. In an indicator, the combination including, an alternating current generator including in combination an armature winding and a cooperating magnetic flux producing rotor, said winding having a positive temperature coefficient of resistance, negative temperature coefficient resistors located in proximity to said armature winding so constructed and arranged as to compensate for the effect of temperature changes upon the system, and a substantially fixed annular ring surrounding a portion of the permanent magnet rotor and having a characteristic such that its magnetism decreases substantially upon increases in temperature, and vice versa, whereby said resistors and ring are effective to compensate for the effect of temperature changes upon the magnetism of said rotor and the resistance of said winding.

21. In apparatus of the type described, the combination including, an alternating current generator including in combination an armature winding and a cooperating magnetic flux producing rotor, said winding having a positive temperature coefficient of resistance, and negative temperature coefficient resistance means located in proximity to said armature winding, said resistance means having a characteristic such that the coefficient of resistance is greater in magnitude in a lower than a higher temperature range, and magnetic means located in proximity to said rotor constructed of metal, the permeability of which decreases substantially for unit variations in temperature in a high temperature range, whereby the resistance means and magnetic means are effective to compensate for the effect of temperature changes upon said rotor when said energy source is placed in a higher temperature region.

22. In an indicator, the combination including, indicating means, electromagnetic means comprising an armature winding for said indicating means, a source of electrical energy for said electromagnetic means, said source including an armature winding and a cooperating magnetic flux producing rotor, said windings having positive temperature coefficients of resistance, and a substantially fixed annular ring made of metal having a characteristic such that its magnetism decreases substantially upon increases in temperature, and vice versa, in proximity to said flux producing rotor to compensate for the effect of temperature changes upon the magnetism of said rotor.

23. In an indicator, the combination including, indicating means, electromagnetic means comprising an armature winding for operating said indicating means, a source of electrical energy for said electromagnetic means, said source including an armature winding and a cooperating magnetic flux producing rotor, said windings having positive temperature coefficients of resistance, and a substantially fixed annular ring made of metal having a characteristic such that its magnetism decreases substantially upon increases in temperature, and vice versa, located in proximity to said flux producing rotor to compensate for the effect of temperature changes upon the magnetism of said rotor, said ring being so constructed that it overcompensates for the changes in magnetism of said permanent magnet rotor, whereby it compensates, at least in part, for variations in the resistance of said winding resulting from changes in the temperature thereof.

24. In an indicator, the combination including, indicating means, electromagnetic means comprising an armature winding for operating said indicating means, a source of electrical energy for said electromagnetic means, said source including an armature winding and a cooperating magnetic flux producing rotor, said windings having positive temperature coefficients of resistance, negative temperature coefficient resistors located in proximity to the second-mentioned armature winding so constructed and arranged as to compensate for the effect of temperature changes upon the system, and a substantially fixed annular ring surrounding a portion of the permanent magnet rotor and having a characteristic such that its magnetism decreases substantially upon increases in temperature, and vice versa, whereby said resistors and ring are effective to compensate for the effect of temperature changes upon the magnetism of said rotor and the resistance of said winding.

25. In apparatus of the type described, the combination including, indicating means, electromagnetic means comprising an armature winding for operating said indicating means, a source of electrical energy for said electromagnetic means, said source including an armature winding and a cooperating magnetic flux producing rotor, said windings having positive temperature coefficients of resistance, and negative temperature coefficient resistance means located in proximity to the second-mentioned armature winding, said resistance means having a characteristic such that the coefficient of resistance is greater in magnitude in a lower than a higher temperature range, and magnetic means located in proximity to said rotor constructed of metal, the permeability of which decreases substantially for unit variations in temperature in the higher temperature range, whereby the resistance means and magnetic means are effective to compensate for the effect of temperature changes upon said rotor when said energy source is placed in a high temperature region.

26. In apparatus of the type described, the combination including, indicating means, electromagnetic means comprising an armature winding adapted to produce a revolving flux and an induction type rotor actuated thereby for operating said indicating means, said winding having a positive temperature coefficient of resistance, and negative temperature coefficient resistance means located in proximity to said electromagnetic means adapted to undercompensate for variations in the resistance of the winding occasioned by ambient temperature and current variations.

27. In apparatus of the type described, the combination including, indicating means, electromagnetic means comprising an armature winding and an induction type rotor actuated thereby for operating said indicating means, said winding having a positive temperature coefficient of resistance, and negative and positive temperature coefficient resistance means located in proximity to said electromagnetic operating means for compensating for variations in the resistance of the circuit occasioned by ambient temperature and current variations, said resistance means being so construed and arranged as conjointly to overcompensate for the effect of temperature variations upon the resistance of said winding, whereby said resistors are effective to compensate also for the effect of temperature changes upon said induction type rotor.

HORACE M. NORMAN.

---

CERTIFICATE OF CORRECTION.

Patent No. 2,339,743. January 18, 1944.

HORACE M. NORMAN.

It is hereby certified that error appears in the printed specification of the above numbered patent requiring correction as follows: Page 2, second column, line 39, strike out the word "in" before --the--; page 10, first column, line 13, claim 18, for "combinaiton" read --combination--; page 11, second column, line 13, claim 27, for "construed" read --constructed--; and that the said Letters Patent should be read with this correction therein that the same may conform to the record of the case in the Patent Office.

Signed and sealed this 25th day of April, A. D. 1944.

Leslie Frazer (Seal)

Acting Commissioner of Patents.

CERTIFICATE OF CORRECTION.

Patent No. 2,339,743. January 18, 1944.

HORACE M. NORMAN.

It is hereby certified that error appears in the printed specification of the above numbered patent requiring correction as follows: Page 2, second column, line 39, strike out the word "in" before --the--; page 10, first column, line 13, claim 18, for "combinaiton" read --combination--; page 11, second column, line 13, claim 27, for "construed" read --constructed--; and that the said Letters Patent should be read with this correction therein that the same may conform to the record of the case in the Patent Office.

Signed and sealed this 25th day of April, A. D. 1944.

Leslie Frazer (Seal) Acting Commissioner of Patents.